US008275703B1

(12) United States Patent
Billman

(10) Patent No.: US 8,275,703 B1
(45) Date of Patent: Sep. 25, 2012

(54) SYSTEMS AND METHODS FOR PROCESSING BANK ACCOUNT DEPOSITS

(75) Inventor: Bradly Jay Billman, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 12/249,987

(22) Filed: Oct. 13, 2008

(51) Int. Cl.
*G06Q 40/00* (2006.01)
(52) U.S. Cl. .......................................... 705/39; 705/35
(58) Field of Classification Search ...................... 705/35
See application file for complete search history.

(56) References Cited

U.S. PATENT DOCUMENTS

| | | | |
|---|---|---|---|
| 7,383,223 B1 | 6/2008 | Dilip et al. | |
| 7,497,372 B1 | 3/2009 | Robinson et al. | |
| 2001/0034682 A1 | 10/2001 | Knight et al. | |
| 2002/0022966 A1 | 2/2002 | Horgan | |
| 2002/0116335 A1* | 8/2002 | Star | 705/42 |
| 2003/0097303 A1 | 5/2003 | Agee et al. | |
| 2004/0002910 A1 | 1/2004 | Mizukami | |
| 2004/0015436 A1* | 1/2004 | Understein | 705/39 |
| 2004/0236681 A1 | 11/2004 | Modigliani et al. | |
| 2005/0071283 A1 | 3/2005 | Randle et al. | |
| 2005/0177510 A1 | 8/2005 | Hilt et al. | |
| 2006/0229986 A1* | 10/2006 | Corder | 705/45 |
| 2007/0053518 A1 | 3/2007 | Tompkins | |
| 2007/0244816 A1* | 10/2007 | Patni et al. | 705/45 |
| 2008/0010194 A1 | 1/2008 | Thomas | |
| 2008/0027844 A1* | 1/2008 | Little et al. | 705/35 |
| 2008/0091600 A1 | 4/2008 | Egnatios et al. | |
| 2008/0096507 A1 | 4/2008 | Erola | |
| 2009/0089211 A1* | 4/2009 | Morse | 705/41 |

OTHER PUBLICATIONS

Shared branches mean more resources, space, personnel Lynn Lofton. The Mississippi Business Journal. Jackson: May 21, 2007. vol. 29, Iss. 21; p. 27.*
Shared branches mean more resources, space, personnel Lynn Lofton. The Mississippi Business Journal. Jackson: May 21, 2007. vol. 29, Iss. 21 p. 27.*
Shared branches mean more resources, space, personnel Lynn Lofton. The Mississippi Business Journal. Jackson: May 21, 2007.*
Riverside County's Credit Union Partners to Offer Commercial Real Estate and Small Business Loans Anonymous. Inland Empire Business Journal. Ontario: Feb. 1, 2004.*
"Savings Account Information Page", http://web.archive.org/web/20060314154633/http://home.ingdirect.com/products/products . . ., ING Direct, 1 page.
"ING Direct USA—Frequently Asked Questions, Linked Accounts", http://web.archive.org/web/20060314154724/http://home.ingdirect.com/faqs/faqs.asp?s=Li . . ., ING Direct, 1 page.
"ING Direct USA—Frequently Asked Questions, The basics on the Automatic Savings Plan", http://web.archive.org/web/20060314154729/http://home.ingdirect.com/faqs/faqs.asp?s=A . . ., ING Direct, 1 page.

* cited by examiner

*Primary Examiner* — William Rankins
(74) *Attorney, Agent, or Firm* — Brooks, Cameron & Huebsch, PLLC

(57) ABSTRACT

A system for processing bank account deposits may comprise at least one subsystem that creates an account at a first bank by a second bank on behalf of a customer of the second bank, at least one subsystem that sets up an automatic transfer to the second bank from the account created at the first bank, and at least one subsystem that accepts an automatic transfer from the account created at the first bank at the second bank, said automatic transfer resulting from a deposit made by the customer at the first bank.

21 Claims, 7 Drawing Sheets

SYSTEMS AND METHODS FOR PROCESSING BANK ACCOUNT DEPOSITS

CROSS REFERENCE TO RELATED APPLICATIONS

The patent applications below (including the present patent application) are filed concurrently and share a common title and disclosure, each of which is hereby incorporated herein by reference in its entirety:
U.S. patent application Ser. No. 12/249,990;
U.S. patent application Ser. No. 12/249,993;
U.S. patent application Ser. No. 12/249,994; and
U.S. patent application Ser. No. 12/249,997.

BACKGROUND

Depositing cash or checks is often problematic for customers of banks that lack many braches within a particular city, or lack many branches in multiple cities and states. This problem may especially arise with customers who often move residences or travel. If the customer's bank does not have a branch close to the customer's location, the customer may have to mail in a check deposit, wire cash to their bank account, or just hold on to the cash for an extended period of time until they can find a branch location. Also, even if there is a branch location close to the customer, it may be difficult to find and involve the customer calling their bank or going on-line to fond branch location nearby, if any. Among other problems, this inconvenience may result in lost time, increased risk in misplacing or losing the cash or check, and lost interest for the customer and bank.

In this regard, there is a need for systems and methods that overcome shortcomings of the prior art.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In consideration of the above-identified shortcomings of the art, systems and methods for
processing bank account deposits are provided. For several embodiments, a system for processing bank account deposits may comprise at least one subsystem that creates an account at a first bank by a second bank on behalf of a customer of the second bank, at least one subsystem that sets up an automatic transfer to the second bank from the account created at the first bank, and at least one subsystem that accepts an automatic transfer from the account created at the first bank at the second bank, said automatic transfer resulting from a deposit made by the customer at the first bank.

Other features and embodiments of the invention are described below.

BRIEF DESCRIPTION OF THE DRAWINGS

Processing bank account deposits is further described with reference to the accompanying drawings in which.

DETAILED DESCRIPTION

Certain specific details are set forth in the following description and figures to provide a thorough understanding of various embodiments. Certain well-known details often associated with computing and software technology are not set forth in the following disclosure to avoid unnecessarily obscuring the various embodiments. Further, those of ordinary skill in the relevant art will understand that they can practice other embodiments without one or more of the details described below. Finally, while various methods are described with reference to steps and sequences in the following disclosure, the description as such is for providing a clear implementation of various embodiments, and the steps and sequences of steps should not be taken as required to practice the embodiments.

Figure 1:
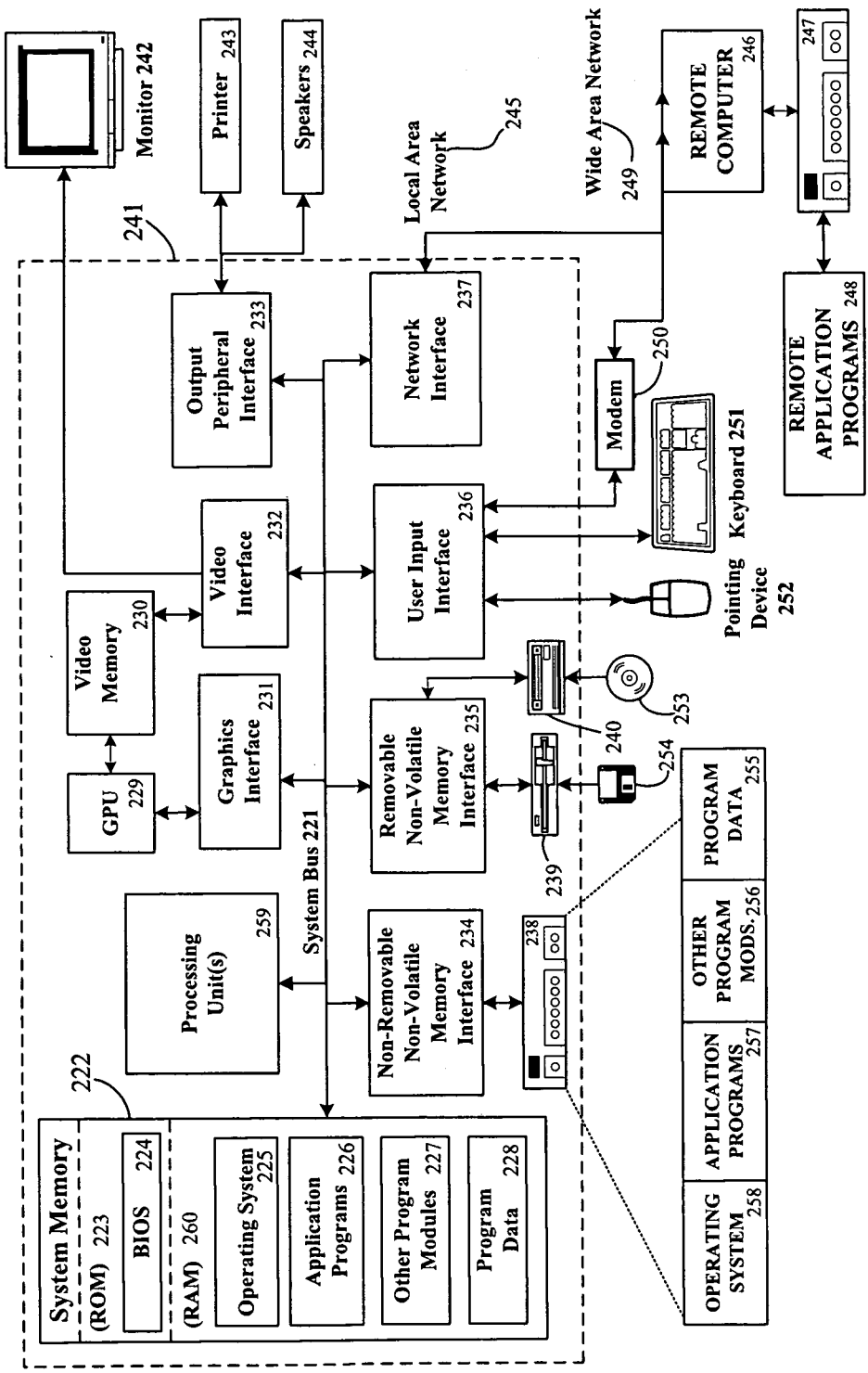
FIG. 1 is a block diagram representing an exemplary computing device suitable for use in conjunction with implementing processing bank account deposits.

Referring next to FIG. 1, shown is a block diagram representing an exemplary computing device suitable for use in conjunction with implementing the processes described below. For example, the computer-executable instructions that carry out the processes and methods for processing bank account deposits may reside and/or be executed in such a computing environment as shown in FIG. 1. The computing environment 220 is only one example of a suitable computing environment and is not intended to suggest any limitation as to the scope of use or functionality of the embodiments. Neither should the computing environment 220 be interpreted as having any dependency or requirement relating to any one or combination of components illustrated in the exemplary computing environment 220. For example a computer game console may also include those items such as those described below for use in conjunction with implementing the processes described below.

Aspects of the embodiments are operational with numerous other general purpose or special purpose computing environments or configurations. Examples of well known computing systems, environments, and/or configurations that may be suitable for use with the embodiments include, but are not limited to, personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the embodiments may be implemented in the general context of computer-executable instructions, such as program modules, being executed by a computer. Generally, program modules include routines, programs, objects, components, data structures, etc. that perform particular tasks or implement particular abstract data types. Aspects of the embodiments may also be practiced in distributed computing environments where tasks are performed by remote processing devices that are linked through a communications network. In a distributed computing environment, program modules may be located in both local and remote computer storage media including memory storage devices.

An exemplary system for implementing aspects of the embodiments includes a general purpose computing device in the form of a computer 241. Components of computer 241 may include, but are not limited to, a processing unit 259, a system memory 222, a graphics interface 231, a graphics processing unit (GPU), video memory 229, and a system bus 221 that couples various system components including the system memory 222 to the processing unit 259. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 241 typically includes a variety of computer readable media. Computer readable media can be any available media that can be accessed by computer 241 and include both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, random access memory (RAM), read-only memory (ROM), Electrically Erasable Programmable Read-Only Memory (EEPROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 241. Communication media typically embody computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared and other wireless media. Combinations of the any of the above should also be included within the scope of computer readable media.

The system memory 222 includes computer storage media in the form of volatile and/or nonvolatile memory such as ROM 223 and RAM 260. A basic input/output system (BIOS) 224, containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 1 illustrates operating system 225, application programs 226, other program modules 227, and program data 228.

The computer 241 may also include other removable/non-removable, volatile/nonvolatile computer storage media. By way of example only, FIG. 1 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through a non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 1 provide storage of computer readable instructions, data structures, program modules and other data for the computer 241. In FIG. 1, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus 221, but may be connected by other interface and bus structures, such as a parallel port, game port or a universal serial bus (USB). A monitor 242 or other type of display device is also connected to the system bus 221 via an interface, such as a video interface 232. In addition to the monitor 242, computer 241 may also include other peripheral output devices such as speakers 244 and printer 243, which may be connected through an output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 1. The logical connections depicted in FIG. 1 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device 247. By way of example, and not limitation, FIG. 1 illustrates remote application programs 248 as residing on the remote memory storage device 247. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the embodiments, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the embodiments. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the embodiments, e.g., through the use of an application programming interface (API), reusable controls, or the like. Such programs are preferably implemented in a high level procedural or object-oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the embodiments in the context of one or more stand-alone computer systems, the embodiments are not so limited, but rather may be implemented in connection with any computing environment, such as a network or distributed computing environment. Still further, aspects of the embodiments may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

Figure 2:
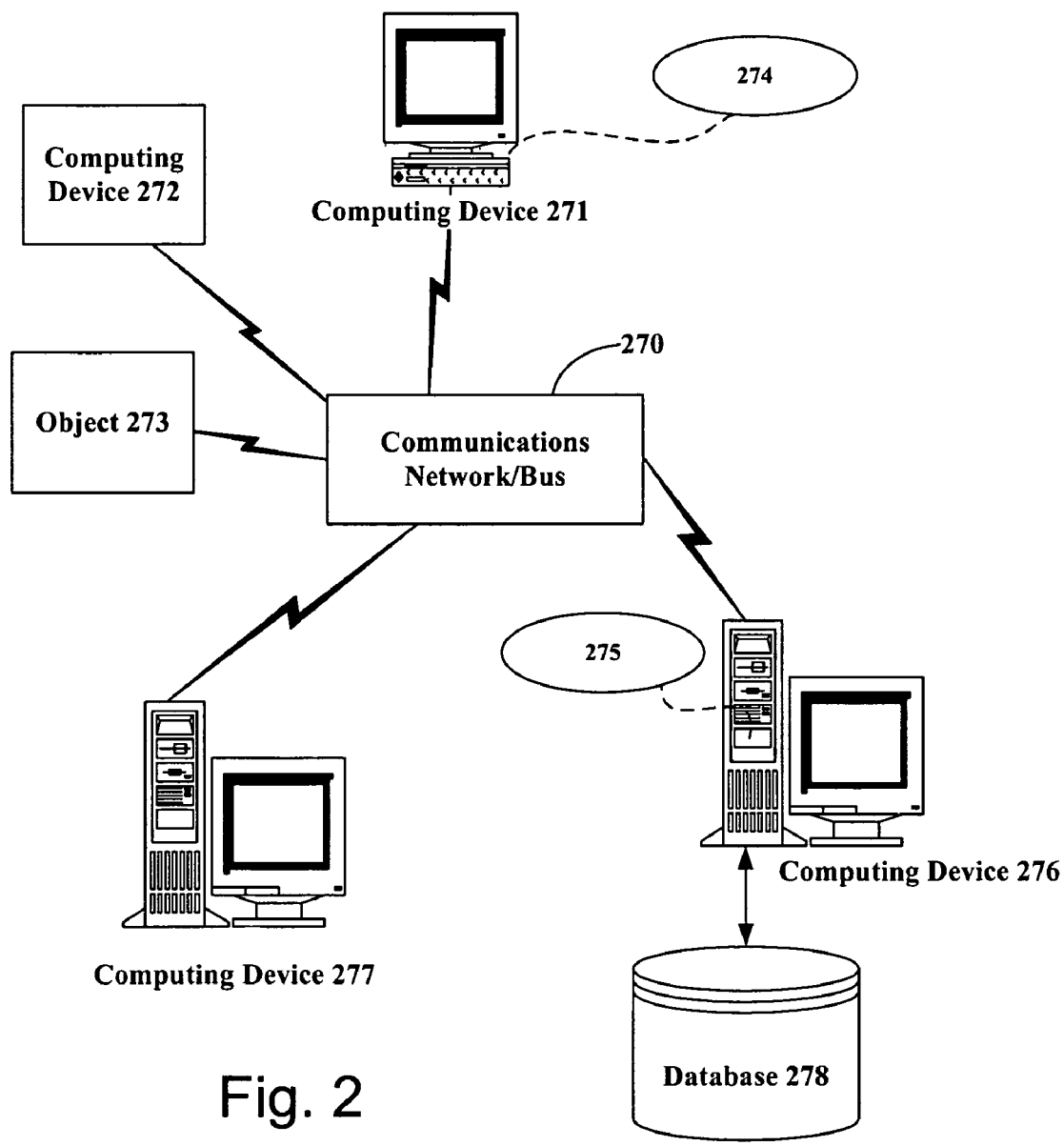
FIG. 2 illustrates an exemplary networked computing environment in which many computerized processes may be implemented to perform processing bank account deposits.

Referring next to FIG. 2, shown is an exemplary networked computing environment in which many computerized processes may be implemented to perform the processes described below. For example, parallel computing may be part of such a networked environment with various clients on the network of FIG. 2 using and/or implementing systems and methods for processing bank account deposits as described herein. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 2 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity may be responsible for the maintenance and updating of a database 278 or other storage element.

This network 270 may itself comprise other computing entities that provide services to the system of FIG. 2, and may itself represent multiple interconnected networks. In accordance with aspects of the embodiments, each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 2 and the further diversification that can occur in computing in a network environment such as that of FIG. 2, the systems and methods provided herein cannot be construed as limited in any way to a particular computing architecture. Instead, the embodiments should be construed in breadth and scope in accordance with the appended claims.

Figure 3:
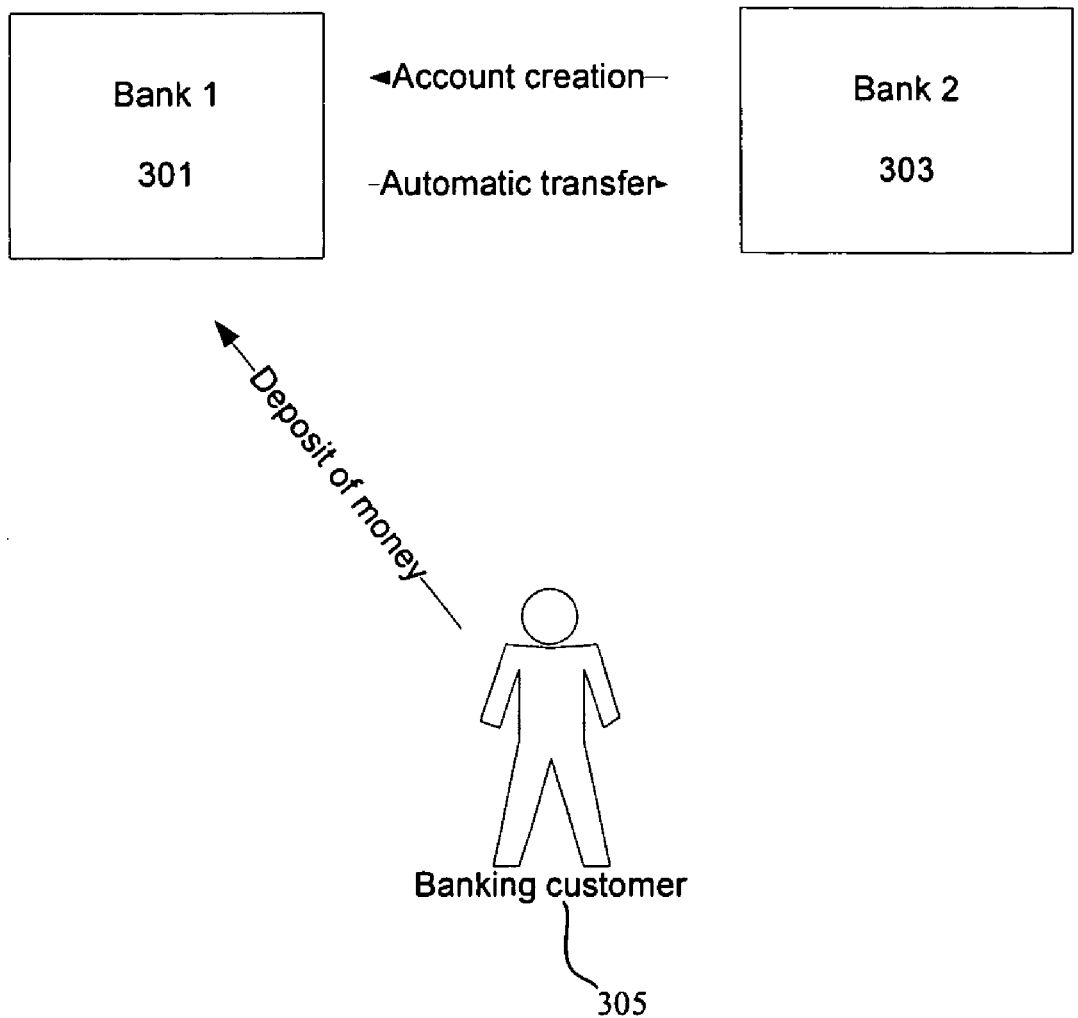
FIG. 3 is an example diagram illustrating an example of a customer using a system for processing bank account deposits.

Referring next to FIG. 3, shown is an example diagram illustrating an example of a customer using a system for processing bank account deposits. Shown is an example bank 1 301, an example bank 2 303 and an example banking customer 305. Bank 1 301 may be a bank that is a separate legal entity than that of bank 2 303, but banking customer 305 may want to use bank 1 to accept a deposit into an existing account of the banking customer 305 at bank 2 303. For example, the banking customer 305 may be traveling and thus not have a branch of their bank 2 located close to the banking customer 305. However, bank 1 301 may have a branch within close proximity to the banking customer's current location. At the request of banking customer 305 (such as over the phone or Internet, etc.) bank 2 303 may create an account on behalf of banking customer 305 at bank 1 301 into which the banking customer 305 may make a deposit. The amount of deposit may then be automatically transferred to the existing banking customer 305 account at bank 2.

Figure 4:
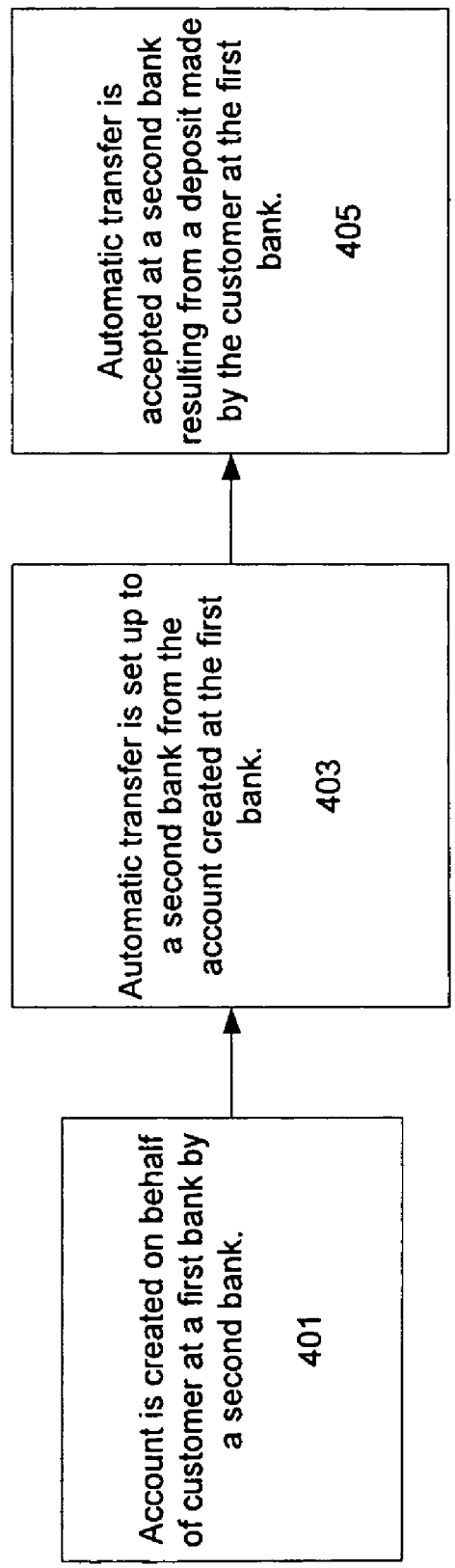
FIG. 4 is a flow chart illustrating an example process for processing bank account deposits from a perspective of a customer's original bank.

Referring next to FIG. 4, shown is a flow chart illustrating an example process for processing bank account deposits from a perspective of a customer's original bank. First, an account is created (401) on behalf of a customer at a first bank by a second bank. For example, the first bank may be a bank at which the customer wants to use to accept a deposit to their existing bank account at the second bank. This account creation may be accomplished in a number of different ways, including automatic creation based upon a request received by the first bank from the second bank that includes required information for account creation such as name, address, identification information, power of attorney, etc. The account creation request and subsequent creation may be performed electronically using a computing environment as described above or otherwise. Also, the account may be created for deposit only, for example, so that funds may be deposited, but not withdrawn. Also, the account creation may include a minimum deposit amount made by the customer or bank creating the account on behalf of the customer. Fees charged or associated with the created account to the customer may be reimbursed by the second bank. In addition, the customer may view Account activity and manage the created account on-line, for example, either through an on-line banking web site provided by the first bank, the second bank, or both. However, the customer may be required to allow access to the created account by the second bank for management functions and to allow transfers.

An automatic transfer may then be set up (403) to the second bank from the account created at the first bank. For example, the automatic transfer may be an automatic transfer to the second bank of any amount deposited into the account created at the first bank. The automatic transfer may be set up, initiated, or created by the first bank, second bank, or customer themselves. The required information to set up the automatic transfer may have also been included in the initial account creation request or as part of the account creation process.

Once the customer makes a deposit into the account created at the first bank the automatic transfer is accepted (405) at the second bank resulting from the deposit made by the customer at the first bank. For example, the automatic transfer amount to the second bank will be the amount of the deposit made by the customer at the first bank.

Figure 5:
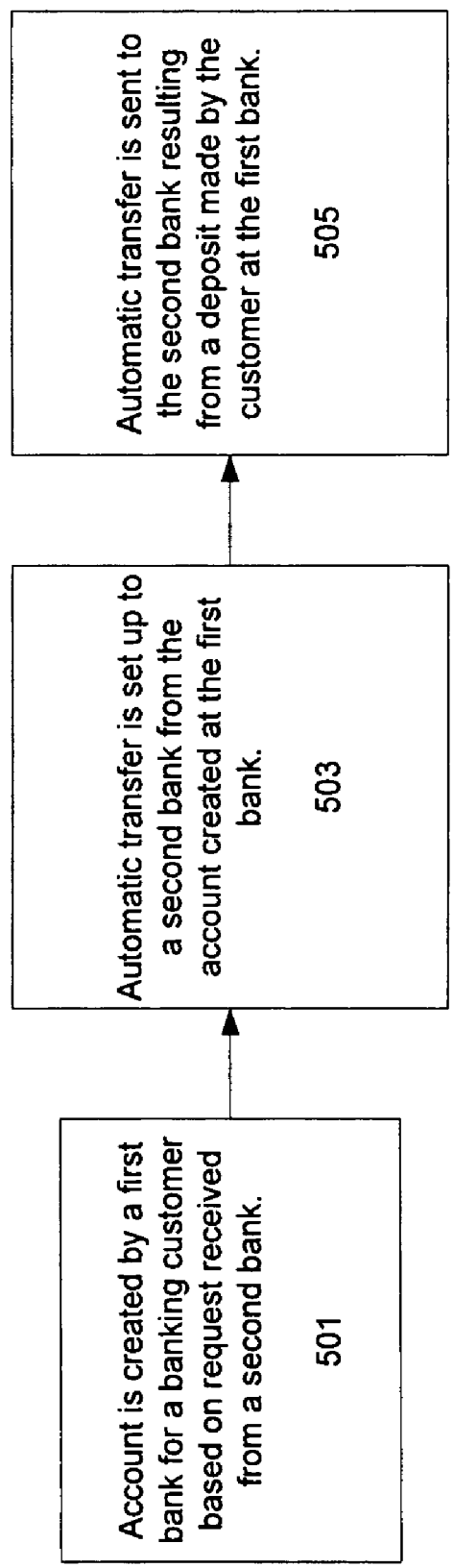
FIG. 5 is a flow chart illustrating an example process for processing bank account deposits from a perspective of a first bank at which the customer wants to make a deposit.

Referring next to FIG. 5, shown is a flow chart illustrating an example process for processing bank account deposits from a perspective of a first bank at which the customer wants to make a deposit. First, an account is created (501) is created by a first bank for a banking customer based on a request received from a second bank. An automatic transfer is set up (503) to the second bank from the account created at the first bank. For example, the automatic transfer may be an automatic transfer to the second bank of any amount deposited into the account created at the first bank. An automatic transfer is then sent (505) to the second bank resulting from a deposit made by the customer at the first bank. For example, the automatic transfer amount sent to the second bank will be the amount of the deposit made by the customer at the first bank.

Figure 6:
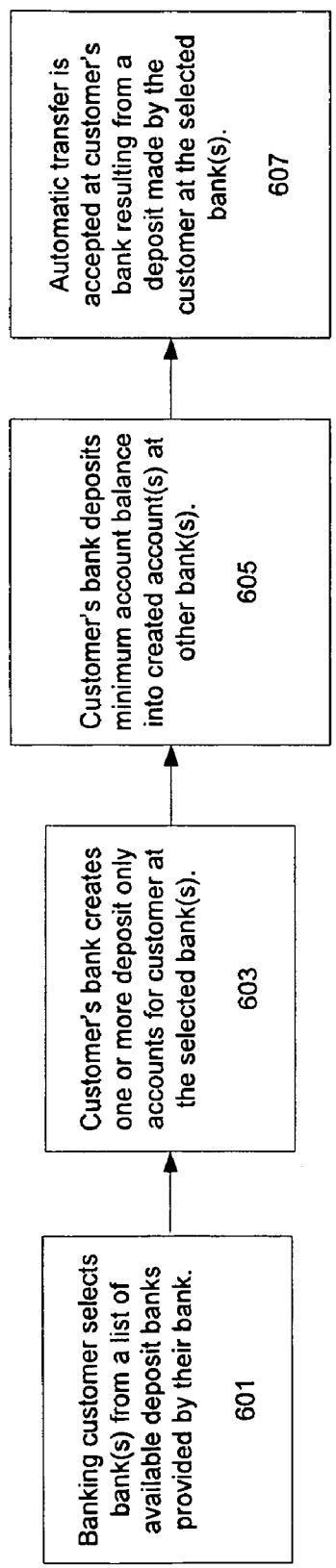
FIG. 6 is a flow chart illustrating an example process for processing bank account deposits involving a selection of deposit banks by the customer.

Referring next to FIG. 6, shown is a flow chart illustrating an example process for processing bank account deposits involving a selection of deposit banks by the customer. First, a banking customer may select (601) one or more banks from a list of available deposit banks provided by their current bank. This list may include banks with which the customer's current bank has relationships in order to facilitate account creation for use by the customer to make deposits. Also, the list may be updated dynamically based upon the customer's current location as determined by global positioning systems (GPS), triangulation, location input provided by the customer, or other means. This list may be provided electronically and accessed remotely, such as through the Internet, web site, mobile device, telephone, etc. The selection of the one or more banks by the customer may also be made remotely and electronically such as through the Internet, web site, mobile device, telephone, etc.

The customer's bank then creates (603) one or more deposit only accounts including an automatic transfer set up on each account for the customer at the selected bank(s) as described above, for example. The customer's bank may then deposit (605), if required, a minimum account balance into the created account(s) at the selected bank(s). An automatic transfer may then be accepted (607) at the customer's bank resulting from a deposit made by the customer at one of the selected banks.

Figure 7:
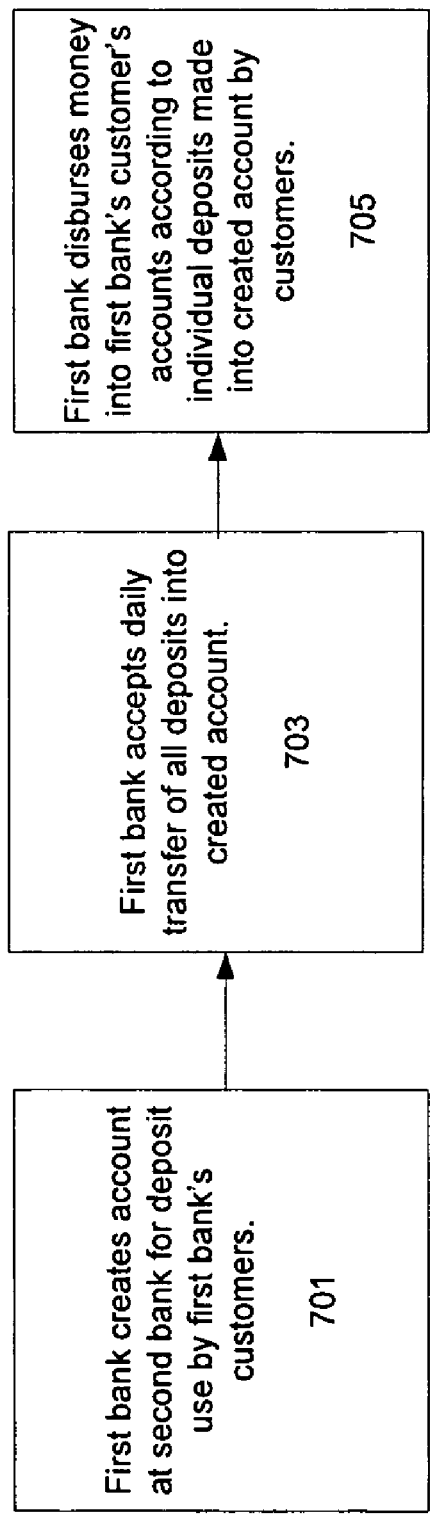
FIG. 7 is a flow chart illustrating an alternative example process for processing bank account deposits.

Referring next to FIG. 7, shown is a flow chart illustrating an alternative example process for processing bank account deposits. A first bank creates (701) an account at a second bank for deposit use by first bank's customers. For example, this account may be created at the second bank in the name of and be owned by the first bank, but accept deposits made at the second bank made by customers of the first bank. The first bank then accepts (703) a periodic (e.g., daily) automatic transfer of all deposits made into the account created at the second bank. The first bank then disburses (705) money into the appropriate customer accounts at the first bank according to individual deposits made by the customers into the account created at the second bank. For example, the disbursement may be made according to the deposit slips (electronically or otherwise) received by the second bank from each customer making a deposit. The first bank may create such accounts at various other banks to provide the customers of the first bank a wider range of physical locations to make deposits. Also, the first bank may have a special customer service representative or designated bank teller at various branches of the second bank that provides this deposit service to the first banks' customers at the second bank.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

The invention claimed is:

1. A system for processing bank account deposits comprising:
    a processor;
    a memory communicatively coupled to the processor storing machine readable instructions that, when executed by the processor, cause the processor to:
    create an account at a first bank by a second bank on behalf of a customer of the second bank, wherein the second bank initiates a deposit into the account on behalf of the customer and uses account information from the customer of the second bank to create the account;
    accept from the second bank, at a request of the first bank, a minimum required balance into the account created at the first bank;
    set up an automatic transfer to an account at the second bank from the account created at the first bank, wherein the second bank is allowed access to the account created at the first bank to allow the automatic transfer to the account at the second bank from the account created at the first bank; and
    accept an automatic transfer from the account created at the first bank to the account at the second bank, said automatic transfer resulting from a deposit made by the customer at the first bank; and
    wherein the account at the first bank and the account at the second bank are both held by the same customer.

2. The system of claim 1 wherein the automatic transfer is in the amount of the deposit made at the first bank.

3. The system of claim 1 wherein the account created at the first bank is an account that only accepts deposits.

4. The system of claim 1 wherein the first bank is a separate legal entity from the second bank.

5. The system of claim 1 wherein the instructions, that when executed by the processor, cause the processor to create the account as a result of a request made by the customer.

6. The system of claim 5 wherein the request is made via a wireless device of the customer.

7. The system of claim 1 wherein the account created at the first bank is one of the following types of accounts: checking, savings, investment, retirement.

8. A method for processing bank account deposits comprising:
    creating, via a computing device, an account at a first bank by a second bank on behalf of a customer of the second bank, wherein the second bank initiates a deposit into the account on behalf of the customer and uses account information from the customer of the second bank to create the account;
    accepting, from the second bank, at a request of the first bank, a minimum required balance into the account created at the first bank;
    setting up, via the computing device, an automatic transfer to an account at the second bank from the account created at the first bank, wherein the second bank is allowed access to the account created at the first bank to allow the automatic transfer to the account at the second bank from the account created at the first bank;
    accepting, via the computing device, an automatic transfer from the account created at the first bank to the account at the second bank, said automatic transfer resulting from a deposit made by the customer at the first bank; and
    wherein the account at the first bank and the account at the second bank are both held by the same customer.

9. The method of claim 8 wherein the automatic transfer is in the amount of the deposit made at the first bank.

10. The method of claim 8 wherein the account created at the first bank is an account that only accepts deposits.

11. The method of claim 8 wherein the first bank is a separate legal entity from the second bank.

12. The method of claim 8 wherein the creating of the account is a result of a request made by the customer.

13. The method of claim 12 wherein the request is made via a wireless device of the customer.

14. The method of claim 8 wherein the account created at the first bank is one of the following types of accounts: checking, savings, investment, retirement.

15. A non-transitory computer-readable medium for processing bank account deposits, the non-transitory computer-readable medium comprising computer-readable instructions for:
    creating an account at a first bank by a second bank on behalf of a customer of the second bank, wherein the second bank initiates a deposit into the account on behalf of the customer and uses account information from the customer of the second bank to create the account;
    accepting, from the second bank, at a request of the first bank, a minimum required balance into the account created at the first bank;
    setting up an automatic transfer to an account at the second bank from the account created at the first bank, wherein the second bank is allowed access to the account created at the first bank to allow the automatic transfer to the account at the second bank from the account created at the first bank; and accepting an automatic transfer from the account created at the first bank to the account at the second bank, said automatic transfer resulting from a deposit made by the customer at the first bank; and wherein the account at the first bank and the account at the second bank are both held by the same customer.

16. The computer-readable medium of claim 1 wherein the automatic transfer is in the amount of the deposit made at the first bank.

17. The computer-readable medium of claim 1 wherein the account created at the first bank is an account that only accepts deposits.

18. The computer-readable medium of claim 1 wherein the first bank is a separate legal entity from the second bank.

19. The computer-readable medium of claim 1 wherein the computer-readable instructions for creating of the account comprise computer-readable instructions for creating of the account initiating from a request made by the customer.

20. The computer-readable medium of claim 19 wherein the request is made via a wireless device of the customer.

21. The computer-readable medium of claim 1 wherein the account at the first bank is one of the following types of accounts: checking, savings, investment, retirement.

\* \* \* \* \*